United States Patent [19]

Naae et al.

[11] Patent Number: 5,076,361
[45] Date of Patent: Dec. 31, 1991

[54] GEL METHOD FOR DECREASING PERMEABILITY AROUND A WELLBORE

[75] Inventors: Douglas G. Naae, Houston; Lawrence E. Whittington, Katy, both of Tex.

[73] Assignee: Texaco Inc., White Plains, N.Y.

[21] Appl. No.: 579,139

[22] Filed: Sep. 7, 1990

[51] Int. Cl.$^5$ .......................................... E21B 33/138
[52] U.S. Cl. .................................. 166/294; 166/295; 166/300; 252/315.3
[58] Field of Search ........................ 252/8.551, 315.3; 166/270, 294, 295, 300; 523/130, 132

[56] References Cited

U.S. PATENT DOCUMENTS

| | | | |
|---|---|---|---|
| 2,034,347 | 3/1936 | Lommis et al. | 166/294 |
| 2,439,833 | 4/1948 | Wagner | 166/294 |
| 3,241,612 | 3/1966 | Hiller | 166/294 X |
| 4,039,029 | 8/1977 | Gall | 166/294 |
| 4,172,055 | 10/1979 | DeMartino | 252/8.553 X |
| 4,378,049 | 3/1983 | Hsu et al. | 166/294 X |

Primary Examiner—George A. Suchfield
Attorney, Agent, or Firm—Jack H. Park; Kenneth R. Priem; Harold J. Delhommer

[57] ABSTRACT

The invention is a method for decreasing formation permeability in an underground formation around a wellbore by injecting an aqueous fresh water solution comprising about 0.9% to about 3.0% by weight of hydroxy propyl cellulose having an average molecular weight greater than about 1,000,000 and about 0.4% to about 3.0% by weight of an alkali metal dodecyl sulfate in the ratio of about 3:1 to about 1:1.5 of cellulose to sulfate, said formation must contain a connate brine having a salinity greater than about 20,000 ppm TDS, or an injected brine having a salinity greater than about 20,000 ppm TDS to mix and react with the aqueous solution to form a gel. The invention is also a method for forming a high viscosity gel by mixing hydroxy propyl cellulose, alkali metal dodecyl sulfate and sufficient salinity.

22 Claims, No Drawings

GEL METHOD FOR DECREASING PERMEABILITY AROUND A WELLBORE

BACKGROUND OF THE INVENTION

The present invention relates to a method for forming a gel in an underground formation surrounding a wellbore for the purpose of decreasing permeability in the formation. More particularly, the invention concerns an in situ formed gel of hydroxy propyl cellulose, an alkali metal dodecyl sulfate and brine.

Poor vertical conformance and excessive water production are two problems which afflict most hydrocarbon producing formations. Because of different geological strata having varying permeabilities, fluids injected into and produced from hydrocarbon formations tend to preferentially channel into strata of relatively high permeability. Thus, enhanced oil recovery fluids bypass large concentrations of hydrocarbons and flow through strata that have already been swept of hydrocarbons. This also results in uneconomically high water to oil ratios from producing wells.

Numerous processes have been proposed to alleviate preferential channeling through formation strata of relatively high permeabilities. Most methods involve the injection of an externally formed or in situ formed gel to lower permeability. U.S. Pat. Nos. 4,412,028; 4,494,606; 4,498,539; 4,503,912; 4,561,502 and 4,579,667 all describe the injection of polyacrylamide gels into a formation for profile control. Some polyacrylamide gels suffer from a lack of stiffness. They soften and do not always stay where placed. Polyacrylamides also have limited stability under acidic conditions.

Because of their structure and inexpensive cost, lignins and lignosulfonates have been frequently used to form permeability reducing gels. Reissue U.S. Pat. No. 30,767 and U.S. Pat. No. 4,074,757 set lignosulfonate and water gels by high formation temperatures. Other lignin or lignosulfonate gel patents include U.S. Pat. Nos. 3,896,827; 4,257,813; 4,275,789; 4,296,814; 4,428,429; 4,110,231; 3,985,659 and 4,322,301.

Hydroxy propyl cellulose has been evaluated for different uses in the oil field. It has been screened for polymer flooding applications, but has not been used extensively because of its generally higher cost. See Szabo, M. T., "An Evaluation of Water-Soluble Polymers for Secondary Oil Recovery-Part 1," *Journal of Petroleum Technology*, 1979, p. 553–560.

Gel systems have been formulated using hydroxy propyl cellulose and a suitable cross-linking agent such as titanium, zirconium or antimony. U.S. Pat. Nos. 4,378,049; 4,553,601 and 4,679,645 all disclose such gel systems with cross-linking agents.

U.S. Pat. No. 4,627,494 describes a method of using hydroxy propyl cellulose as a sacrificial agent for surfactant floods. Water-soluble suspensions of hydroxy propyl cellulose and other polymers are disclosed in European Patent Application No. 81301140.0.

British Petroleum has published a report that describes their efforts to develop a "sea water soluble precipitable polymer" for use in the North Sea. A large slug of hydroxy propyl cellulose was required to achieve a small permeability reduction. See Graham, D. E. et al., "Treatment Fluids to Improve Sea Water Injection," *New Technologies for the Exploration and Exploitation of Oil and Gas Resources*, Graham and Trotman, Vol. 2, 1984, p. 860–872.

U.S. Pat. No. 4,169,818 and 4,172,055 disclose the use of hydroxy propyl cellulose with polymaleic anhydride derivatives to form a fluid with increased viscosity. The references disclose use as a hydraulic fluid in well drilling operations.

SUMMARY OF THE INVENTION

The invention is a method for decreasing formation permeability in an underground formation around a wellbore by injecting the components for an in situ formed gel. An aqueous fresh water solution is injected into the formation surrounding a wellbore. The aqueous solution comprises about 0.9% to about 3.0% by weight of hydroxy propyl cellulose having an average molecular weight greater than about 1,000,000 and about 0.4% to about 3.0% by weight of an alkali metal dodecyl sulfate in the ratio of about 3:1 to about 1:1.5 of cellulose to sulfate.

The formation must contain a connate brine having a salinity greater than about 20,000 ppm TDS, or an injected brine having a salinity greater than about 20,000 ppm TDS to mix and react with the aqueous solution to form a gel.

The invention also includes a method for forming a high viscosity gel, comprising mixing an aqueous solution of about 0.4% to about 2% hydroxy propyl cellulose having an average molecular weight greater than about, 1,000,000 with about 0.2% to about 2% by weight alkali metal dodecyl sulfate in the ratio of about 3:1 to about 1:1.5 of cellulose to sulfate, and sufficient salt to give a salinity greater than about 9,000 ppm TDS.

DETAILED DESCRIPTION

The invention process provides a new technology for gel treatments for conformance control. It uses a blend of a cellulosic polymer and a surfactant to form a solution that gels in the reservoir. The trigger for the gel creation is brine. The gel is formed when the polymer and surfactant solution mixes with injected or reservoir brine having a minimum salinity.

Conventional gels are formed by the reaction of a polymer and a chemical cross-linking agent. The cross-linking agent is typically a heavy metal ion such as chromium, vanadium, molybdenum or iron. For these gels to be effectively placed in the reservoir, the cross-linking agent must be either injected into the reservoir after or before the polymer, or the rate of the gelation reaction must be controlled so the gelling slug can be pushed into the formation before it sets up. Each gel treatment must be tailored to specific reservoir conditions to ensure a successful job.

The instant invention has advantages over conventional cross-linked polymer gels. It does not need a cross-linking agent, or tailoring for a specific reservoir. By sidestepping these requirements, the invention process offers the potential for more effective gel treatments and deeper placement in a reservoir than a conventional cross-linked gel. The cost of the chemicals used herein is comparable to gels form with cross-linked polyacrylamides.

In corefloods, the present invention reduces the relative permeability of Berea sandstone cores by 95%. In a parallel coreflood, the gel diverted over 90% of the fractional flow to a second parallel core. The gel is not affected by waterflood residual oil. Furthermore, the gel has been found to be stable in sandstone cores after a two month period with no significant loss of permeability reduction. In bottle tests of the gel, syneresis was not observed, even after a six month period.

The present invention decreases formation permeability in an underground formation surrounding a wellbore by a method comprising injecting a aqueous fresh water solution into the formation surrounding the wellbore, said aqueous solution comprising about 0.6% to about 3.0%, preferably about 0.9% to about 1.5% by weight of hydroxy propyl cellulose having an average molecular weight greater than about 1,000,000, and about 0.4% to about 3.0%, preferably about 0.5% to about 1.5% by weight of an alkali metal dodecyl sulfate, preferably sodium dodecyl sulfate. The components of the aqueous solution are present in the ratio of about 3:1 to about 1:1.5, preferably about 2:1 to about 1:1 of cellulose to sulfate.

To form a gel, the injected aqueous solution must react with a brine having a salinity greater than about 20,000 ppm TDS, preferably greater than about 50,000 ppm TDS. This brine can be either connate brine or a brine injected into the formation surrounding a wellbore.

Sufficient mixing of the connate or injected brine with the aqueous solution of cellulose and sulfate is needed in order to raise the salinity of the injected aqueous solution to a minimum of about 10,000 ppm TDS without divalent ion content, preferably 25,000 ppm TDS or higher. To ensure this mixing, it is preferred to inject a slug of brine into the formation after the injection of the aqueous solution even if the formation surrounding the wellbore contains brine of a sufficient salinity. More preferably, a second slug of the aqueous solution is injecting into the formation surrounding the wellbore after the injection of the brine. Most preferably, the initial injection of aqueous solution and brine is followed by repeating the injection of the aqueous solution and brine in an alternating fashion. The use of multiple smaller slugs of aqueous solution and brine insures a more thorough mixing and a more effective gel.

It should be noted that higher concentrations of gel components are required in the injected gel solution than are needed to form gels. This is because the gel solution components are injected in a fresh water and must be diluted by contact with brine to form a gel. An intimate mixing of gel solution and brine in the formation will reduce the component concentration by 25%, 50% or more before gel formation stops the lowering of the concentrations.

The effective maximum salinity of fresh water in the injected gel solution is unknown. Our experiments indicated that a fresh water salinity of 820 ppm TDS with 170 ppm divalants was fine, and that gels may form with salinity as low as 8,000 to 10,000 ppm TDS. The practical fresh water salinity limit lies somewhere between these two extremes and will depend upon the facts of each individual treatment. Although a fresh water salinity below,1,000 ppm is preferred, it should be remembered that fresh water is expensive in the oil field.

Hydroxy propyl cellulose is a water-soluble non-ionic cellulose polyether formed by the reaction of cellulose with propylene oxide. It is a commercial product manufactured and sold in several molecular weight ranges. The molecular weight found effective for the instant gel invention is a molecular weight averaging over 1,000,000.

Sodium dodecyl sulfate is an anionic surfactant produced by the sulfation of dodecyl alcohol. It is a commercial product manufactured by several companies. 1988 production was over 24,000,000 pounds.

Hydroxyl propyl cellulose is readily soluble in cold water. However, the polymer precipitates from solution when the temperature is raised to 40°–45° C. The solution first turns cloudy, and then forms a swollen precipitate as the hydroxy propyl cellulose comes out of solution. The addition of ionic surfactants such as an alkali metal dodecyl sulfate to solution of hydroxy propyl cellulose can raise the normal cloud point to 90° C. This seems to be the practical temperature limit for the invention method.

It is desirable to have a gel set within the formation surrounding the wellbore and not on the sandface of the wellbore. To insure that gelation does not occur at the sandface, it is preferred to inject a small pusher or spacer slug of fresh water between the aqueous solution and subsequently injected brine to flush out the wellbore and push the aqueous solution away from the sandface before it contacts the brine. It may also be desirable to inject a fresh water slug into the formation prior to the first injection of the aqueous solution to clear brine from the wellbore and near wellbore area. Such procedures should insure that initial gel setting occurs at a more desirable 10' to 30' into the formation away from the sandface.

Pushing the gel deeper into the formation away from the wellbore is a more important consideration when a producing well is treated to reduce water production. After injection, the well must be shut in for a time sufficient to allow the gel to set.

It may also be possible to inject the hydroxy propyl cellulose and alkaline metal dodecyl sulfate in completely separate slugs. Such a procedure may make deeper penetration of the gel components into the formation possible, while carrying the disadvantages of less thorough mixing resulting in a lower degree of success, and more complex preparation procedures on the surface. However, it is preferred to inject the hydroxy propyl cellulose and alkali metal dodecyl sulfate in the same slug.

Where possible, it is desirable to isolate the offending high permeability zone by one or more packers placed in the wellbore and injecting into that isolated portion of the formation. Other operational procedures to isolate zones may be employed. Isolation insures that the gel injection is confined to the desired high permeability intervals.

As discussed in greater detail in the examples, connate brine or injected brine having a divalent ion concentration greater than about 1500 ppm may cause problems with the invention method. It is well known that high levels of divalent cations, such as calcium or magnesium, cause phase instability and separation of anionic surfactants. Gel formation may be prevented.

The addition of about 0.1% to about 2%, preferably about 0.2% to about 1% by weight of a solubilizer to the aqueous solution may prevent phase separation of the alkali metal dodecyl sulfate from the aqueous solution when the connate or injected brine has a divalent ion concentration greater than about 1500 ppm. The solubilizer may substitute for a portion of the sulfate surfactant. The use of a solubilizer may permit the invention gel to form at divalent ion concentrations of 5000 ppm or higher. See Example 34 where a hard gel formed with 0.5% hydroxy propyl cellulose, 0.25% sodium dodecyl sulfate and 0.25% sodium lauryl ether sulfate in the presence of a brine having a salinity of 37,500 ppm TDS and a divalent ion concentration of 5,000 ppm.

Solubilizers effective for increasing the divalent ion tolerance of the invention method include conventional solubilizers known in the art of surfactant flooding such as ethoxylated alcohols, alkylphenols and their sulfates and sulfonates. A preferred solubilizer class is the alcohol ethoxy sulfates, which include alkali metal lauryl ether sulfates having an ethoxylation level greater than or equal to 2.

The invention also includes a method for forming a high viscosity gel, which comprises mixing an aqueous solution of about 0.4% to about 2%, preferably about 0.5% to about 1% hydroxy propyl cellulose having an average molecular weight greater than about 1,000,000 with about 0.2% to about 2%, preferably about 0.25% to about 1% by weight alkali metal dodecyl sulfate in the ratio of about 3:1 to about 1:1.5 of cellulose to sulfate, and sufficient salt to give a salinity of greater than about 9,000 ppm TDS, preferably greater than about 25,000 ppm TDS.

All of the disclosure relating to a method for decreasing permeability relates to the method for forming a gel. The only difference is the concentration ranges of the various gel solution components. The concentration ranges are different because in the method for decreasing permeability the injected fresh water solution must be diluted by connate or injected brine to form the gel. This dilution by injected or connate brine decreases the concentration level of the injected components when they mix and gel in the formation.

If the added brine or salt results in a divalent ion concentration greater than about 1,500 ppm, about 0.05% to about 1% by weight of a solubilizer may be added to the aqueous solution to prevent phase separation from said aqueous solution of the alkali metal dodecyl sulfate. The same solubilizers disclosed earlier may also be employed to prevent phase separation. The preferred solubilizer is an alcohol ethoxy sulfate.

The following examples will further illustrate the novel method of the present invention of setting gels for permeability reduction and profile control. These examples are given by way of illustration and not as limitations on the scope of the invention. Thus, it should be understood that the composition and method of setting the gels may be varied to achieve similar results within the scope of the invention.

EXAMPLES 1-5

Solutions of hydroxy propyl cellulose (HPC) and sodium dodecyl sulfate (SDS) were mixed with brine in bottles to investigate the effect of concentration and salinity on gel viscosity. As Examples 1-5 of Table 1 indicate, the viscosity of Example 3 increased from 14 centipoise to 70,000 centipoise in Examples 4 and 5 when brine was added. A high viscosity gel was formed. The invention gel is not a stiff or ringing gel. However, it does exhibit the tongueing effect of gels.

The hydroxy propyl cellulose employed in all examples has an average molecular weight of about 1,150,000 and a viscosity of 190 centipoise for a 0.5% solution in water (Brookfield viscometer at 6 rpm, UL adapter. It is sold under the trademark Klucel-H by Aqualon, Inc.

TABLE 1

Effect of Concentration and Salinity on Viscosity

| Ex. | % HPC | % SDS | Salinity, ppm TDS | Viscosity,[1] cp |
|---|---|---|---|---|
| 1 | 1.0 | 1.0 | 0 | 81 |
| 2 | 0.5 | 0 | 0 | 190 |
| 3 | 0.5 | 0.5 | 0 | 14 |
| 4 | 0.5 | 0.5 | 36,600[2] | 70,000 |
| 5 | 0.5 | 0.5 | 73,200[2] | 70,000 |

[1] Viscosities measured on a Brookfield viscometer. The UL adapter at 6 rpm was used for low values, and spindle #2 at 0.6 rpm was used for high values.
[2] 3400 ppm of divalent ions.

EXAMPLES 6-21

A series of solutions were prepared in which the concentrations of hydroxy propyl cellulose and sodium dodecyl sulfate were varied up to 0.5%, and salinity was varied up to 36,600 ppm TDS. The solutions were mixed in bottles with brine prepared using sodium chloride only without divalent cations. The results are collected in Table 2. Our definition for a hard gel was a viscosity of 50,000 cp.

TABLE 2

Effect of Concentration and Salinity on Viscosity

| Ex. | % HPC | % SDS | Salinity, ppm TDS | Viscosity,[1] cp |
|---|---|---|---|---|
| 6 | 0.25 | 0.25 | 9,100 | 10 |
| 7 | 0.25 | 0.25 | 18,300 | 1,000 |
| 8 | 0.25 | 0.25 | 36,600 | 2,400 |
| 9 | 0.25 | 0.5 | 9,100 | 3 |
| 10 | 0.25 | 0.5 | 18,300 | 4 |
| 11 | 0.25 | 0.5 | 36,600 | 7 |
| 12 | 0.375 | 0.375 | 22,850 | 4,900 |
| 13 | 0.5 | 0 | 0 | 200 |
| 14 | 0.5 | 0.25 | 0 | 80[1] |
| 15 | 0.5 | 0.25 | 9,100 | 99,000 |
| 16 | 0.5 | 0.25 | 18,300 | 50,000 |
| 17 | 0.5 | 0.25 | 36,600 | 2,000 |
| 18 | 0.5 | 0.5 | 0 | 14 |
| 19 | 0.5 | 0.5 | 9,100 | 45 |
| 20 | 0.5 | 0.5 | 18,300 | 70,000 |
| 21 | 0.5 | 0.5 | 36,600 | 68,000 |

[1] Viscosities measured on a Brookfield viscometer. The UL adapter at 6 rpm was used for low values, and spindle #2 at 0.6 rpm was used for high values.

Generally, Table 2 indicates that gels can be formed when 0.5% hydroxy propyl cellulose is used. With proper salinity, gel form may be possible at about 0.35 to about 0.4% hydroxy propyl cellulose. Example 12 with 0.375% hydroxy propyl cellulose and a low salinity of about 23,000 ppm TDS came close to forming a hard gel. Overall, viscosity is controlled by the salinity and amount of sulfate surfactant.

EXAMPLES 22-32

The results of eleven bottle tests, Examples 22-32, are summarized in Table 3. They measure the effect of overall salinity and divalent cations on the formation of gels from 0.5% hydroxy propyl cellulose and 0.5% sodium dodecyl sulfate. The viscosities were not quantified, but were judged qualitatively.

TABLE 3

Effect of Salinity and Divalent Cations on Gel 0.5% HPC/0.5% SDS System

| Ex. | Salinity, ppm TDS | $Ca^{+2}$, ppm | Gel. Comments |
|---|---|---|---|
| 22 | 100,000 | 0 | Gel |
| 23 | 50,000 | 0 | Gel |
| 24 | 50,000 | 1500 | Gel |
| 25 | 50,000 | 3250 | Weak gel, some precipitate |
| 26 | 50,000 | 5000 | Very weak gel, precipitate |

TABLE 3-continued

Effect of Salinity and Divalent Cations on Gel
0.5% HPC/0.5% SDS System

| Ex. | Salinity, ppm TDS | $Ca^{+2}$, ppm | Gel, Comments |
|---|---|---|---|
| 27 | 37,500 | 1500 | Gel |
| 28 | 37,500 | 3250 | No gel, precipitate |
| 29 | 37,500 | 5000 | No gel, precipitate |
| 30 | 25,000 | 1500 | Weak gel, some precipitate |
| 31 | 25,000 | 3250 | No gel, precipitate |
| 32 | 25,000 | 5000 | No gel, precipitate |

As indicated in Table 2, gels formed at salinities as low as 9,100 ppm TDS without the presence of divalent cations. But as Examples 25 and 26 of Table 3 illustrate, the presence of 3,250 ppm and 5,000 ppm of divalent cations weakened gels formed with 50,000 ppm of divalent cations weakened gels formed with 50,000 ppm TDS salinity brine. When salinity dropped to 25,000 ppm TDS in Examples 30-32, the presence of 3,250 ppm and 5,000 ppm of divalent ions prevented gel formation. This is in direct contrast with Examples 20-21 of Table 2 wherein the same system formed hard gels at 18,000 and 36,000 ppm TDS salinity without the presence of divalent cations.

EXAMPLES 33-36

The effect of the addition of sodium lauryl ether sulfate solubilizer on the gel systems of Examples 29 and 32 was investigated in Examples 33-36 of Table 4. Sipon ES, a trademarked sodium lauryl ether sulfate having an average of three ethylene oxide groups sold by Alcolac Inc., was substituted for equal amounts of sodium dodecyl sulfate in amounts ranging from 0.05% to 0.5% by weight.

TABLE 4

Effect of Salinity and Solubilizer on
0.5% HPC/0.5% (SDS:SLES) Gel Systems

| Ex. | Salinity, ppm TDS | $Ca^{+2}$, ppm | SDS:SLES[1] | Gel, Comments |
|---|---|---|---|---|
| 29 | 37,500 | 5000 | 10:0 | No gel, precipitate |
| 33 | 37,500 | 5000 | 9:1 | Weak gel, precipitate |
| 34 | 37,500 | 5000 | 5:5 | Gel |
| 35 | 37,500 | 5000 | 0:10 | No gel, clear |
| 32 | 25,000 | 5000 | 10:0 | No gel, precipitate |
| 36 | 25,000 | 5000 | 5:5 | No gel, some precipitate |

[1]Sodium lauryl ether sulfate

The effect of the solubilizer is amply demonstrated by comparing Examples 33 and 34 to Example 29. Gels were formed in Examples 33 and 34 despite the presence of 5,000 ppm divalent calcium ions. The substitution of only 0.05% by weight of sodium laurel ether sulfate for an equal amount of sodium dodecyl sulfate produced a weak gel compared to no gel in Example 29. When 0.25% by weight of solubilizer was substituted for an equal amount of sodium dodecyl sulfate in Example 34, a strong gel was produced.

Example 35 indicates that the solubilizer will not replace the sodium dodecyl sulfate in the gel system. The complete substitution of the solubilizer for the sodium dodecyl sulfate produced no gel in Example 35.

EXAMPLE 37

Corefloods were performed in 12" ×2" ×2" Berea sandstone cores equipped with 2 injection ports and one production port. At 54° C., the cores were saturated with either 73,000 ppm TDS brine having about 3,500 ppm divalents or a fresh water having a salinity of about 820 ppm TDS including 170 ppm divalents, depending on the design of the experiment. The cores were then saturated with an Oklahoma crude oil having an API gravity of about 29° and then waterflooded to residual oil saturation.

In the first flood of Example 37, a core was brine saturated, oil saturated, and then waterflooded with brine to residual oil saturation. A 1.0% hydroxy propyl cellulose/1.0% by weight sodium dodecyl sulfate solution in fresh water was injected into the core in multiple small slugs of about 0.05 pore volumes that were alternated with small slugs of the 73,200 ppm TDS brine. Substantially smaller slugs of fresh water were injected after the gel solution and before injection of the brine to ensure that the gel would not form on the face of the core. The alternating slugs were employed to achieve as much mixing as possible of the gel solution with the connate water and injected water in the core. A total of 0.36 pore volumes of gel solution was injected.

Pressure transducers were used to monitor inlet pressures. Injection rates were 1" per day. Produced fluids were fractionated and analyzed for gel solution components and produced salinity.

The injected gel solution was formulated as 1% of each component in deionized water. If intimate mixing occurred in the core between equal amounts of this slug and the injected or connate water, then the resulting slug of hydroxy propyl cellulose/sodium dodecyl sulfate would have a concentration of about 0.5% hydroxy propyl cellulose and 0.5% sodium dodecyl sulfate. Thus, the viscosity of any gel formed would be dependent on the combined salinity of connate water and injected water from both the gel solution and the injected brine.

The flood confirmed that a gel was formed in the Example 37 core. Several observations lead to this conclusion. First, the relative permeability to brine injection fell to 5% of the original permeability, a 95% reduction. A much higher injection pressure was required by the gel. Permeabilities were calculated using the viscosity of water at 54° C. of about 0.6 cp.

Second, only brine was produced from the core. Neither hydroxy propyl cellulose or sodium dodecyl sulfate appeared in the effluent.

Third, the salinity of the produced water declined in a manner consistent with the gel solution slug of fresh water mixing with the connate and injected brine in the core. For this test, the expected salinity would be around 50% of the 73,200 ppm TDS of the injected brine if intimate mixing occurred. The produced water at the mobile pore volume would have a salinity of 75% of the 73,200 ppm TDS brine. The actual produced salinity was the expected 75% of the original brine at 0.584 pore volume. This value is very close to the initial mobile pore volume of 0.598.

EXAMPLE 38

An experiment on a sandpack was performed in the same fashion as Example 37. 0.24 pore volumes of a gel solution of 1% hydroxy propyl cellulose and 1% sodium dodecyl sulfate in fresh water was injected into the core in small slugs of approximately 0.05 pore volumes alternated with brine slugs of 73,200 ppm TDS. A gel formed in the core which reduced permeability to injected brine to 95 millidarcies (mD) from its initial value of 1,570 mD, a 94% reduction in permeability.

EXAMPLE 39

A control experiment was performed on a core saturated with the example fresh water of about 820 ppm TDS salinity having 170 ppm divalent ions. A fresh water slug of 1% hydroxy propyl cellulose and 1% sodium dodecyl sulfate (0.4 pore volumes) was injected into the core followed by the same fresh water.

The initial permeability of the core to water was 99 mD, at 54° C. During the injection of the gel solution, the permeability was 108 mD, calculated using the viscosity of the gel solution in fresh water at 54° C. of 35.2 cp. Almost three pore volumes of fresh water were injected after the gel solution slug. Permeability was measured at 88 mD, only a slight reduction in permeability. Both hydroxy propyl cellulose and sodium dodecyl sulfate eluted from the core. Clearly, a gel was not formed without brine having the required salinity.

EXAMPLE 40

To test the ability of the hydroxy propyl cellulose/sodium dodecyl sulfate get to divert fluid flow, a parallel coreflood was performed. Following the procedure of Examples 37–38, two Berea sandstone cores with similar permeability were saturated with brine, then oil, and waterflooded with brine to a residual oil saturation of 0.421. The two cores were then set up for parallel corefloods. The experiment was performed at room temperature instead of the previous 54° C. to increase the viscosity of the crude oil.

The flood was started by injecting brine to both cores. Slugs of 1% hydroxy propyl cellulose/1% sodium dodecyl sulfate alternating with slugs of the 73,200 ppm TDS brine were injected into the first core. A hard gel formed in the first core, lowering its relative permeability to about 7% of the original permeability, a 93% reduction. After gel formation, most of the injected brine diverted to the second core.

Initially, 80% of the percent of the fractional flow entered the waterflooded first core. After the gel was formed in the first core, fractional flow was reversed with 90% of injected brine flowing to the second core. This illustrates the ability of the gel to divert fluid flow.

EXAMPLE 41

After the parallel core flood, the first core was shut in. Two months later, 73,200 ppm TDS brine was injected into the core at a rate of 1 foot per day to test for permeability changes. After the injection of 3.1 pore volumes of brine, permeability was determined to be 3 mD. This corresponds to an 83% reduction of initial permeability, comparing favorably to the 93% permeability reduction achieved two months earlier.

Seven months after the parallel core flood, the first core was again tested for permeability changes. With brine injection, the permeability was determined to be 3 mD, unchanged from the test five months ago. The gel was stable over a seven month period.

EXAMPLE 42

Bottle tests with the gel show that syneresis did not occur. Several bottle tests of 0.5% hydroxy propyl cellulose/0.5% sodium dodecyl sulfate gels in 36,000 ppm TDS brine were examined after a period of six months. No shrinkage or changes in the gels were noted.

The method of the present invention can be subject to many modifications and changes by those skilled in the art without departing from the spirit of essential characteristics of the present invention. Accordingly, it should be completely understood that the concepts disclosed in the description are illustrative only, and are not intended as limitations on the scope of the invention.

What is claimed is:

1. A method for decreasing formation permeability in an underground formation around a wellbore, comprising:

injecting an aqueous fresh water solution into the formation surrounding a wellbore, said aqueous solution comprising about 0.6% to about 3.0% by weight of hydroxy propyl cellulose having an average molecular weight greater than about 1,000,000, and about 0.4% to about 3.0% by weight of an alkali metal dodecyl sulfate, in the ratio of about 3:1 to about 1:1.5 of cellulose to sulfate, and said formation containing connate brine of a salinity greater than about 20,000 ppm TDS to react with said solution to form a gel.

2. The method of claim 1, further comprising injecting a brine having a salinity greater than about 20,000 ppm TDS into the formation surrounding the wellbore after injecting said aqueous solution.

3. The method of claim 2, further comprising injecting a second slug of said solution into the formation surrounding the wellbore after the injection of the brine.

4. The method of claim 1, further comprising adding about 0.1% to about 2% by weight of a solubilizer to said aqueous solution to prevent phase separation from said aqueous solution of the alkali metal dodecyl sulfate when the connate brine has a divalent ion concentration greater than about 1500 ppm.

5. The method of claim 4, wherein the solubilizer is an alcohol ethoxy sulfate.

6. A method for decreasing formation permeability in an underground formation around a wellbore, comprising:

injecting an aqueous fresh water solution into the formation surrounding a wellbore, said aqueous solution comprising about 0.6% to about 3.0% by weight of hydroxy propyl cellulose having an average molecular weight greater than about 1,000,000, about 0.4% to about 3.0% by weight of an alkali metal dodecyl sulfate, in the ratio of about 3:1 to about 1:1.5 of cellulose to sulfate; and injecting a brine having a salinity greater that about 20,000 ppm TDS into the formation surrounding the wellbore.

7. The method of claim 6, further comprising injecting a second slug of said aqueous solution into the formation surrounding the wellbore after the injection of the brine.

8. The method of claim 6, further comprising repeating the injection of said aqueous solution and said brine in an alternating fashion.

9. The method of claim 6, further comprising isolating the portion of the formation wherein it is desired to decrease permeability with packers in the wellbore, and injecting into that isolated portion of the formation.

10. The method of claim 6, wherein the alkali metal dodecyl sulfate is sodium dodecyl sulfate.

11. The method of claim 6, wherein the ratio of cellulose to sulfate is about 2:1 to about 1:1.

12. The method of claim 6, further comprising adding about 0.1% to about 2% by weight of a solubilizer to prevent phase separation from said aqueous solution of the alkali metal dodecyl sulfate when the injected brine has a divalent ion concentration greater than about 1500 ppm.

13. The method of claim 12, wherein the solubilizer is an alcohol ethoxy sulfate.

14. The method of claim 6, wherein the concentration of the hydroxy propyl cellulose is about 0.9% to about 1.5% by weight.

15. The method of claim 6, wherein the concentration of the alkali metal dodecyl sulfate is about 0.5% to about 1.5% by weight.

16. The method of claim 6, wherein the ratio of cellulose to sulfate is about 2:1 to about 1:1.

17. The method of claim 6, further comprising injecting a small slug of fresh water between said aqueous solution and said brine to ensure gelation does not occur at a sandface.

18. The method of claim 6, further comprising flushing the underground formation surrounding the wellbore with fresh water prior to injecting said aqueous solution.

19. The method of claim 6, further comprising adding about 0.1% to about 2% by weight of a solubilizer to said aqueous solution to prevent phase separation from said aqueous solution of the alkali metal dodecyl sulfate when injected brine or connate brine has a divalent ion concentration greater than about 1,500 ppm.

20. The method of claim 19, wherein the solubilizer is an alcohol ethoxy sulfate having an ethoxylation level greater than or equal to 2.

21. The method of claim 20, wherein the solubilizer is sodium lauryl ether sulfate.

22. The method for decreasing formation permeability in an underground formation around a wellbore, comprising:

injecting an aqueous fresh water solution into the formation surrounding a wellbore, said aqueous solution comprising about 0.9% to about 1.5% by weight of hydroxy propyl cellulose having an average molecular weight greater than about 1,000,000 and about 0.5% to about 1.5% by weight of sodium dodecyl sulfate in the ratio of about 2:1 to about 1:1 of cellulose to sulfate;

injecting a brine having a salinity greater than about 50,000 ppm TDS into the formation surrounding the wellbore; and repeating the injection of said aqueous solution and said brine in an alternating fashion.

* * * * *